(12) United States Patent
Blaton

(10) Patent No.: US 7,984,934 B1
(45) Date of Patent: Jul. 26, 2011

(54) BRAZING OF A SPECIAL GAS DELIVERY SYSTEM USING FITTINGS HAVING PURGE ORIFICES

(76) Inventor: David J. Blaton, Squantum, MA (US)

( * ) Notice: Subject to any disclaimer, the term of this patent is extended or adjusted under 35 U.S.C. 154(b) by 225 days.

(21) Appl. No.: 12/231,974

(22) Filed: Sep. 8, 2008

(51) Int. Cl.
*F16L 21/00* (2006.01)

(52) U.S. Cl. ............ 285/417; 285/13; 285/924; 285/901

(58) Field of Classification Search .................... 285/13, 285/14, 924, 901, 417
See application file for complete search history.

(56) References Cited

U.S. PATENT DOCUMENTS

| | | | | |
|---|---|---|---|---|
| 796,781 | A * | 8/1905 | Welsh | 285/14 |
| 2,323,099 | A * | 6/1943 | Patten | 285/14 |
| 2,733,080 | A * | 1/1956 | Gill | 285/14 |
| 2,792,490 | A * | 5/1957 | Risch et al. | 285/22 |
| 3,457,961 | A * | 7/1969 | Long | 138/143 |
| 3,504,935 | A * | 4/1970 | Gullihur | 285/14 |
| 4,032,243 | A * | 6/1977 | Keifert et al. | 403/272 |
| 4,454,405 | A | 6/1984 | Riley | |
| 4,723,064 | A | 2/1988 | Bothe, II | |
| 4,818,629 | A * | 4/1989 | Jenstrom et al. | 428/594 |
| 5,123,840 | A * | 6/1992 | Nates | 285/924 |
| 5,224,738 | A * | 7/1993 | Taga | 285/14 |
| 5,412,981 | A * | 5/1995 | Myers et al. | 73/114.46 |
| 5,824,983 | A | 10/1998 | Huddleston, Jr. | |
| 6,539,970 | B1 | 4/2003 | Knowles et al. | |
| 6,739,204 | B1 | 5/2004 | Barefoot | |
| 7,022,165 | B2 * | 4/2006 | Paglieri et al. | 96/10 |
| 7,527,305 | B2 * | 5/2009 | Hyslop | 285/924 |

* cited by examiner

*Primary Examiner* — David E Bochna
(74) *Attorney, Agent, or Firm* — Burns & Levinson, LLP; Jacob N. Erlich, Esq.; Robert Nathans, Esq.

(57) ABSTRACT

Copper purge fittings for brazing components of a special gas delivery line together are provided. An orifice is located on the top or end portion of each fitting to create a continuous flow of inert purging gas through the delivery line under construction while brazing. Each fitting will reach temperatures exceeding 1500 degrees. By having a continuous flow of inert gas while brazing, the protection of the interior portion of the system remains intact. Without a purge in place, the intense heat would create a rapid immediate buildup of carbon and other contaminates. Brazing is only commenced after the elimination of harmful oxygen and proper flow of purging gas is measured. The purging gas pressure is lowered if it becomes high enough to potentially cause separation of tubular sections from the purge fittings and is raised if a low flow rate is detected indicating potential insufficient flow of purging gas.

7 Claims, 4 Drawing Sheets

ORIFICE SIZE AND CONFIGURATION

| Size of System | Size of Orifice | Amount of Ports | Band Height | Band Width |
|---|---|---|---|---|
| 1/4" | 1/16" | 1 | 1/16" | 1/4" |
| 3/8" | 1/16" | 1 | 1/16" | 1/4" |
| 1/2" | 3/32" | 1 | 1/16" | 1/4" |
| 5/8" | 3/32" | 1 | 1/16" | 1/4" |
| 3/4" | 3/32" | 1 | 1/16" | 1/4" |
| 7/8" | 3/32" | 1 | 1/16" | 1/4" |
| 1" | 3/32" | 1 | 1/16" | 1/4" |
| 1 1/8" | 3/32" | 1 | 1/16" | 1/4" |
| 1 1/4" | 3/32" | 1 | 1/16" | 1/4" |
| 1 3/8" | 3/32" | 1 | 1/16" | 1/4" |
| 1 1/2" | 1/8" | 1 | 1/8" | 5/16" |
| 1 5/8" | 1/8" | 1 | 1/8" | 5/16" |
| 2" | 1/8" | 1 | 1/8" | 3/8" |
| 2 1/8" | 1/8" | 1 | 1/8" | 3/8" |
| 2 1/2" | 1/8" | 1 | 1/8" | 3/8" |
| 2 5/8" | 1/8" | 1 | 1/8" | 3/8" |
| 3" | 1/8" | 1 | 1/8" | 1/2" |
| 3 1/8" | 1/8" | 1 | 1/8" | 1/2" |
| 3 1/2" | 1/8" | 1 | 1/8" | 5/8" |
| 3 5/8" | 1/8" | 1 | 1/8" | 5/8" |
| 4" | 1/8" | 2 | 3/16" | 5/8" |
| 4 1/8" | 1/8" | 2 | 3/16" | 5/8" |
| 6" | 1/8" | 3 | 3/16" | 3/4" |
| 6 1/8" | 1/8" | 3 | 3/16" | 3/4" |
| 8 1/8" | 1/8" | 4 | 1/4" | 1" |

BRAZING OF A SPECIAL GAS DELIVERY SYSTEM USING FITTINGS HAVING PURGE ORIFICES

BACKGROUND OF THE INVENTION

The invention relates to the field of constructing special gas delivery systems. Special gas systems has many different uses such as saving a newborns life with the oxygen/medical air mixture for underdeveloped lungs. There are many special gases listed with special gas systems. Some of the more common gasses are medical air, oxygen, nitrogen, nitrous oxide, helium, carbon dioxide, WAGDV (waste, anesthesia, gas, and disposal and vacuum). It is deemed desirable to facilitate installation of special gas delivery systems for medical facilities, dental facilities, research and development in the medical and pharmaceutical fields, animal facilities, convalescent homes and any other establishment requiring special gas systems.

SUMMARY OF PREFERRED EMBODIMENTS OF THE INVENTION

Solid cast wrought copper purge fittings are connected to various portions of a gas delivery system. An orifice at the top or end portion of each purge fitting is formed in the fitting to let foreign gas components such as oxygen to initially purge out, while letting an inert purging gases fill the interior portion of the system. This will preserve the purity of the system during the complete process of brazing. The orifice of each purge fitting is designed to sustain a continuous positive flow of inert gas throughout the gas supply line being constructed and brazed, so that impurities and carbon buildup will remain at bay during the entire brazing periods. This completes a fundamental process, once incomplete, for installing a crucial special gas system. The purge fittings are advantageously designed to eliminate the use of threaded purge connections that are no longer allowed in any medical gas system according to N.F.P.A. standards.

The fitting cast is made of solid copper from a press machine having a generally cylindrical shape with an orifice at the top or end portion of the fitting. Where necessary, a band is provided on the interior or exterior in the center of the fitting depending on the origin. This is to reinforce the integrity of the fitting, while not deteriorating the interior portion of the fitting. The orifice is correctly sized in relation to supply tube diameters being brazed to the fitting in order to sufficiently effuse purging gas in a proficient manner into the open atmosphere.

A preferred method of using a purge fitting includes the steps of:
(a) forming a line under construction by positioning tubular sections and fittings together;
(b) coupling a purge fitting in an end portion of the line under construction having an orifice therein for passing inert purging gas within the line out of the line;
(c) passing inert purging gas through the line;
(d) while the inert purging gas is being passed through the line, measuring the oxygen content of the inert purging gas;
(e) commencing brazing of the tubular sections and the fittings when measurement of the oxygen content of the inert purging gas indicates the absence of oxygen; and
(f) continuing brazing of the line only while purging gas that is oxygen free continues to be passed through the line; and
(g) maintaining inert purging gas flow through the line after brazing ceases until the line is cool to the touch.

BRIEF DESCRIPTION OF THE DRAWINGS

Other features and advantages of the invention will become more apparent upon further reading of the specification taken in conjunction with the drawings in which:

FIG. 3 discloses a table for indicating relationships between fitting diameters, orifice diameters, the number of orifices and band data of the special fittings of the invention.

DETAILED DESCRIPTION OF PREFERRED EMBODIMENTS OF THE INVENTION

Figure 1:
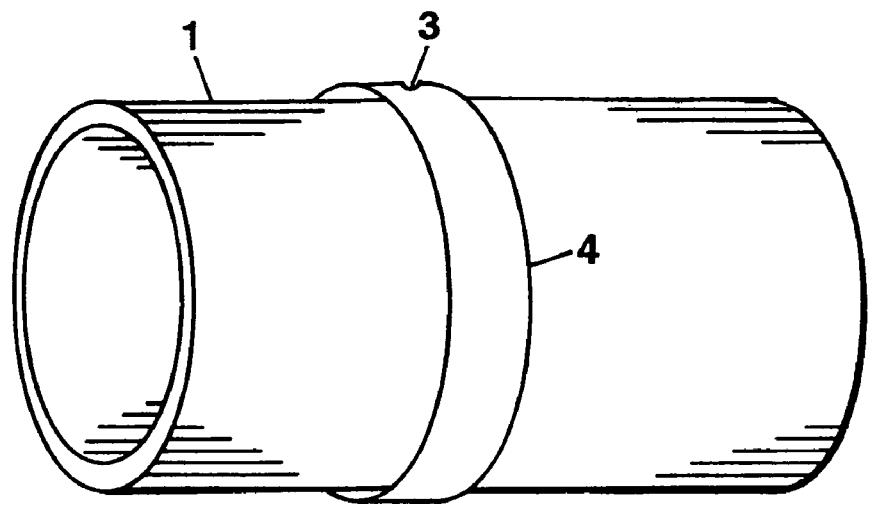
FIG. 1 discloses a front view of a tube purge coupling fitting comprising a copper tube with a band in the center of the fitting, accommodating the purge. It is able to connect 2 tube sections at each end.

One example of using the purge fittings of the invention includes the following steps.
1. A gas supply system consisting of one or more gas supply lines under construction, each supply line having copper tubes and fixtures to be brazed together. The line is positioned between a tank of inert purging gas, typically nitrogen, and an end station where the system user, for example, a dentist, could couple rubber tubing, for example, to a fitting in a terminal portion of the line via a supply outlet, to supply one of the four gases used for dental work. The tube sections are force-fitted (slip-fitted) into standard conventional purge fittings, having no orifices, to form joints to be brazed.
2. A flow meter is coupled between the tank of inert purging gas and the entrance to a supply line for controlling the proper flow rate of purging gas flowing through the line in milliliters per minute, as further described below.
3. A purge cap fitting, having an orifice at its end, is temporarily connected at the end of a line under construction, and an oxygen sensor is placed directly over the orifice to measure the oxygen content of the inert purging gas passed through the supply line under construction.
4. Purging gas flow commences, and brazing of the aforesaid standard fittings to the tube sections may begin after, and only after, the oxygen sensor indicates that no further oxygen is sensed, thus preventing oxidation of the joints during high temperature brazing. Several sections of copper tubing are brazed to and through the conventional purge fittings. Purge gas flow is maintained after the completion of brazing until the line is cool to the touch.
5. The purge cap, having the orifice, that is designated as a continuous purge fitting, since it is not brazed, can be reused continuously. The purge cap is separated from the end of the newly installed first portion of the incomplete supply line, when the next day's second portion of the line is to be constructed. After the next day's second portion of the line is set up, the purge cap will be reapplied to the end of the second tube portion for purging and brazing the second portion of the line brazed to the first portion, as during the preceding day.

6. There is only one purge fitting installed per line at any given time and it will be at the end of a line, branch, or end of the system. A continuous purge fitting, that is never brazed to the line, is used if the newly installed line or system is not finished, and more sections or line portions are to be added to the line under construction.
7. When the last section of the line is finished, a final purge cap having an orifice therein, is positioned at the end of the line beyond the final tie-in point. This continuous purge cap now becomes the final purge cap which will be sealed during brazing, and cut off after a 10-15 minute pressure test for the final tie in.
8. Upon the last day of installation of the last section or portion of the line, the nitrogen purge is now repeated until the oxygen sensor, placed directly over the orifice of the final purge fitting, which can be the aforesaid cap with an orifice, indicates that no oxygen is present and then the orifice of the final purge fitting is sealed with brazing material and the purge fitting brazed to the end of the last tube section of the line extending past the final tie in point.
9. The above steps are repeated for production of a second line, if any, and so forth for all additional lines to be produced.
10. Now the entire system of one or more lines is pressure tested over a twenty-four hour period to sense leaks as described in further detail below.
11. If the newly installed system has multiple lines which is the usual situation, the orifices of all the final multiple purge fittings can be filled and sealed at the same time. The orifices of the continuous page fittings are never sealed and are temporarily used as devices to purge out the lines when they are placed at end portions of the lines under construction.

The purge fittings of the invention include, for example, the aforesaid purge cap, and coupling members for coupling tube sections together, or for coupling gas supply valves or gages to the line under construction. When installing the final purge fitting, it should be installed as the very last fitting in a pipeline when either connecting to an existing system or installing a new system. The connections made between any and all joints should be solidly formed together for an effective purge every time. One must have the inert gas purging at a high flow rate (high volume/minute, gas pressure) until all foreign gases are 100% completely depleted out of the special gas supply system. Then the flow rate of the inert gas is lowered to a sufficient level for brazing compared to initial stages of purging.

The purge fittings operate effectively by supporting a continuous flow of an inert gas from the entrance point for a new special gas system to the outlet source of the purge system that can be a gas supply valve fixture. The flow of the inert gas should be continuous when brazing any part of new special gas systems. When using the purge fittings of the invention, the new system being installed will be free from any debris or carbon buildup. A purge fitting is designed to have a minimum amount of volume discharge of the inert gas when being purged, but having a continuous flow preventing any and all unwanted gasses in the system. This purge system is designed to eliminate the use of threaded purge connections that are no longer allowed in any medical gas system according to N.F.P.A. standards. Also, this purge fitting limits the possibility of dead ends within a special gas system which could collect bacterial after lack of flow.

Figure 4:
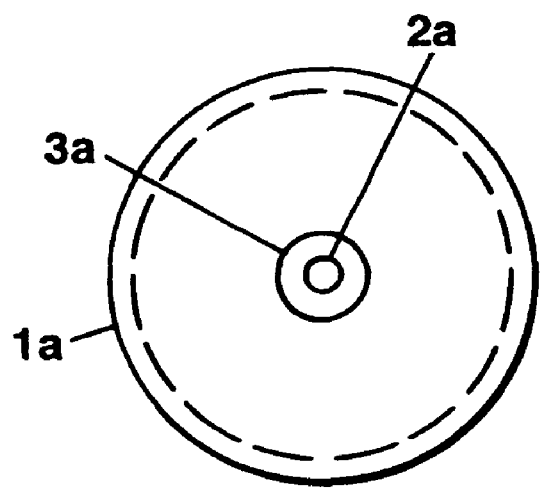
FIGS. 4 and 5 show top and side views of the purge cap fitting.
Figure 5:
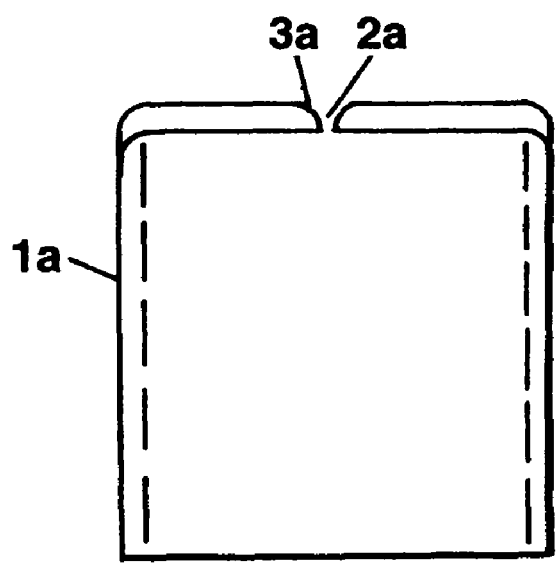

The purge fittings of the invention include the aforesaid purge cap, shown in FIGS. 4 and 5, with an aperture, listed below as the "Cap Purge: a purge cap designed for testing purposes; the purge hole is at the center of the cap. It is able to connect 1 section of copper tubing." The outside diameter of the cylindrical cap 1a is typically 1¼ inches, its length is 1¼ inches, and the purge orifice 2a has a diameter of 3/32 inches and the diameter of the concave portion 3a is ¼ inches.

Figure 2:
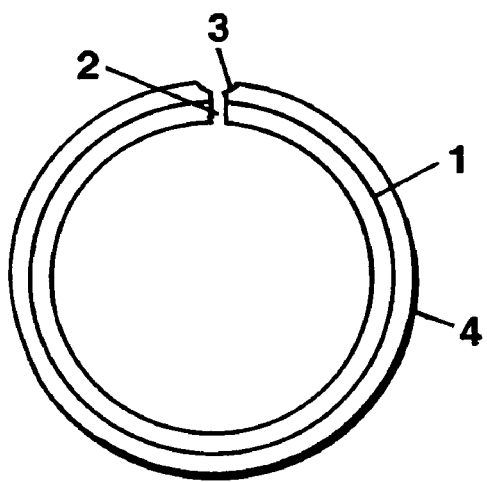
FIG. 2 discloses a side view of the fitting of FIG. 1.

Another type of purge fitting is a purge coupling disclosed in FIGS. 1 and 2. Unlike the purge cap, the orifice of the is on the top of the coupler. This type of purge fitting can be used to couple two tube sections together.

In FIGS. 1 and 2, the orifice 2 of purge fitting 1 is located within the concave structure 3 on the top portion of the fitting. This enhances the performance of the fitting. The orifice 2 should remain on the top portion of the fitting whether it is a horizontal or angle fitting. If it is to be a vertical fitting, then one should braze the lower portion of the fitting first followed by the top portion, ending with the orifice last. This could be the only time during brazing that the sequence of how one should braze is not followed. Due to the importance of brazing, the lower portion of a vertical joint in a special gas system should be brazed first in order to protect the purge hole. Great care must be taken when brazing a vertical joint even with the deflection. If one were to push too much of the brazing rod into the fitting on the top portion of a vertical joint it may inadvertently fill up the purge hole.

The orifice 2 is centered within the concave portion 3 that is located on a raised band 4 designed to go around the purge fitting. The raised copper band of the purge fitting was created to distinguish the differences between similar conventional or standard copper fittings currently being used for special gas systems today. Depending of the diameter of the purge fitting, the band is between ¼ inch to ⅞ wide and 1/16 to ¼ of an inch high as shown in the table of FIG. 3. There will also be a band on the inner part of the purge fitting where necessary to prevent any pre-filling of the purge port hole on the top portion of the fitting. This is known as the deflection for the inner portion of the fitting. These dimensions will coincide exactly to the outer dimensions of the band on the purge fitting. The more commonly found inert purge gasses used during brazing would be nitrogen, ultra pure nitrogen, and argon in special gas systems. The inventor maintains that purging a special gas system correctly calls for heating the fitting to around 1500 degrees Fahrenheit while a continuous flow of an inert gas will keep the integral part of the copper alloy from oxidizing. A nitrogen purge should occupy 100% of the volume supported within the brazed system. Anything less, would have a significant chance of oxidation, creating damage to the system.

The types of purge fitting, having the orifices similar to those shown in FIGS. 1 and 2 and having the parameters shown in the table of FIG. 3, are designed to fit existing copper fitting systems in today's market that can be soldered or brazed. There are nine different forms of purge fittings available:

1. Tube purge: a copper tube with a band in the center of the fitting, accommodating the purge. It is able to connect 2 fittings at each end.
2. Purge Coupling: a copper coupling with a band in the center accommodating the purge. It is able to connect 2 sections of copper tubing.
3. Street coupling: a copper coupling and copper tubing combined with a band in the center of the fitting. It is able to connect 1 section of copper tubing and 1 fitting.
4. 90 degree purge: a copper 90 has a band on the top of the fitting accommodating the purge. It is able to connect 2 sections of copper tubing at an angle.
5. Street 90 degree purge: a copper street 90 has a band on the top of the female portion of the fitting accommodating the purge. It is able to connect 1 section of tubing and 1 section of a fitting at an angle.
6. Cap purge: a purge cap designed for testing purposes, the purge hole is at the center of the cap. It is able to connect 1 section of copper tubing.
7. Plug purge: a plug designed to purge sections of medical or dental gas systems, but not used for final connection. Contains threads to connect to a female copper adaptor.
8. Male adapter cap: a male adaptor and cap in one that has a band on the top side of the cap. Contains threads to connect to a female adapter. Designed to purge sections of special gas systems, but not for final connection.
9. Female adapter cap: a female adapter and cap in one that has a band on the top side of the cap. Contains integral threads to connect to a male adapter. Designed to purge sections of a special gas system, but not for final connection.

Figure 6:
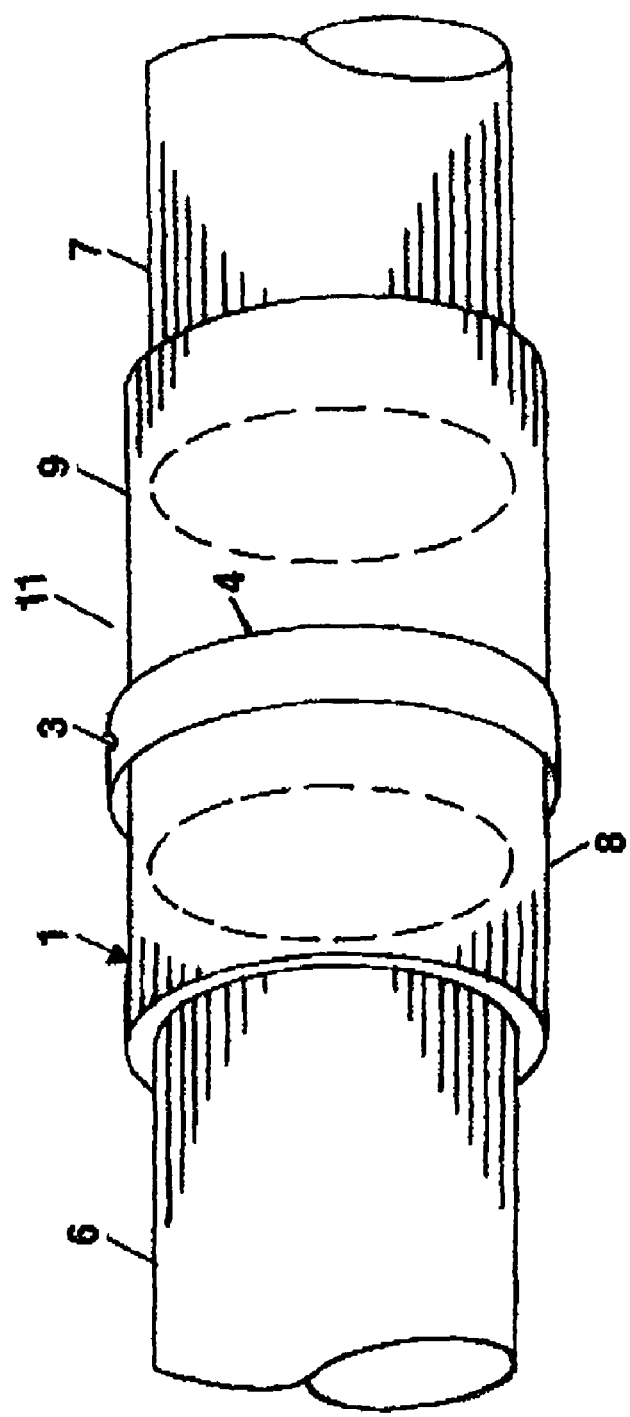
FIG. 6 shows two copper tube sections and the purge coupling fitting of the invention to be brazed together.

A purge coupling fitting, for coupling tubular copper gas transporting tube sections 6 and 7 together by brazing, is illustrated in FIG. 6, said purge fitting having an inlet section 8 for containing a first tubular tube section 6 slip fitted therein without threads and having an outlet section 9 for containing a second tubular tube section 7 slip fitted therein without threads and a central section 11 positioned between said inlet section 8 and said outlet section 9 having at least one purging orifice at 3 for directing purging gases from within said purge coupling fitting directly into the atmosphere, and wherein relationships between purge fitting diameters, purging orifice diameters, and number of orifices are as specified in the table of FIG. 3 and wherein relationships between band height and band width are also specified in the table of FIG. 3.

A purge hole is located on the center of the top portion of the fitting. As shown in the table of FIG. 3, the size of the orifice for the purge port will be 3/32 of an inch in diameter for systems 1 3/8 inches in diameter or less down to a 3/8 and 1/4 inch diameter where the orifice size will be 1/16 inches.

For systems 1 1/2-3 inch in diameter or greater the orifice will be 1/8 inches in diameter. For systems 4 to 1 1/8 inches in diameter there will be 2 orifices within the concave 1/8 inches in diameter. For larger systems there will be a series of 3 or 4 purge holes 1/8 inches in diameter within the single concave structure. This will ensure a proper flow of inert gas in relation to the size of the system. They are all designed in a proficient manner to prevent the least amount of inert gas loss into the open atmosphere while sustaining purity within a system. These fittings are also designed to accommodate difficult situations when installing a new special gas system.

The design of each fitting that has the band structure shown in FIGS. 1 and 2, has a concave structure on the band which will not compromise the integrity of each type of fitting. The concave structure is designed not only to act as a purge, but when filling the purge hole, the concave structure is to be filled with brazing rod as used for each joint. This will ensure that the tensile strength of the orifice and surrounding area is sufficient.

After finishing the final tie in purge fitting, a positive flow of inert gas should remain on until the special gas system is cool to the touch in its entirety. This means that the special gas system must be tepid or cooler before shutting down the purge system. This can typically take up to 30 minutes to cool depending on how large the diameter of the system is. To disregard this, one may have poor results with the purity of the integral part of the system. The main reason for this delay is that if there was a leak in the system and inert purge was shut off to early, the inert gas would dissipate out of the special gas system letting in oxygen to oxidize and damage one's newly installed system. When brazing the starting portions of a system, one may choose to either use a purge cap, male adapter cap, or a female adapter cap. All are used depending on the condition conducive to one's system. These fittings are called continuous purge fittings for a special gas system. For the tie in portion of a special gas system a purge coupling, street purge coupling, tube purge, purge 90, street purge 90 may be used to tie in to the existing portion of the system. These fittings are called final tie in purge fittings for a special gas system. One or all may be used depending on the condition conducive to one's system. It will not be acceptable to use the purge cap, male adapter cap, or the female adapter cap when making a final tie in. These fittings have threads. That is why they are called continuous purge fittings. These conditions are not approved by the N.F.P.A standards for a final tie in. Having a dead end within a special gas system may be permitted as of now by the N.F.P.A, but it is a poor practice to maintain due to the lack of foreign gasses to clearly escape the system when introducing the new gas into the system. This is important to state because sometimes one my use a dead end as a purge outlet leaving the inert gas lingering in the dead end of the pipe.

When brazing the last fitting, being the purge fitting, each side of the fitting will be brazed first, ending with the concave structure last. This is to enforce the proper process in trapping the nitrogen in the system until cooled. It is very important not to overheat the purge fitting or any other special gas fitting when brazing. One may disintegrate the fitting or allow too much brazing rod to enter the system when overheating a joint. When overheating occurs the brazing rod flows much faster with less control of penetration to the joint. A fine balance of heat and brazing rod penetration is necessary for a 100% joint penetration to help prevent any bacteria build up or pre-fill of the purge hole. It is important that a periodic check always be made when brazing a special gas system. When brazing the first joint of a system more volume or flow rate of inert gas is necessary due to the loss of gas from the fittings not brazed. As more joints in the system are brazed the more powerful the purge will be.

Periodic adjustments in gas pressure (flow rate/volume) are needed to eliminate the possibility of joint blow out, that is where too much inert gas pressure builds up within a system and pushes apart 2 sections of the system. It is of equal importance to monitor the amount of inert gas remaining in a system while brazing. Running out of the inert gas before completing the brazing, many times means replacing the section if not the whole system of its entirety. A special sensor with an audible alarm signaling if the supply of inert gas (gas pressure) gets to low could be installed in line with the purge set up to prevent any loss of work and materials. It is preferred to monitor the purge in a very precise manner in relation with the volume of inert gas being used when brazing the final purge port. A special gage measuring the flow rate in liters per minute should be used showing as little as 1 liter per minute. Just the slightest amount of inert gas should be used. It should be detected by the oxygen gas sensor. This should always be used and calibrated periodically to ensure accuracy. The reading should show 0.00% of oxygen gas in the system when brazing, which is the main culprit in oxidizing a system. If any apparent high pressure condition seems evident, one should immediately adjust the volume control lower to prevent any form of a leak when testing. A thorough test of 1 1/2 times the working pressure is required for a 24 hour period with no drop in pressure. A purity test is also done before final tie in to ensure the cleanliness of the special gas system in its entirety. Usually a blow down test of the working pressure of the special gas being installed is done repeatedly with a special white cloth, looking for any signs of carbon, copper, or any other foreign matter that may exist in the system. The tests being conducted require witnesses of the establishment and the certifier hired to inspect each special gas system. If however, there were to be a defect due to improper brazing techniques, the N.F.P.A. states that one non-purged joint is allowed when making final connection to a special gas existing system.

These purge fittings of the invention are only to be used as purge fittings or final tie in special gas fittings when working with a special gas system. If used otherwise, they could cause leaks in a system not easily found of contamination with a system left open. A primary function of the Blaton band purge of the invention is designed to improve the purity and integrity of a special gas system. The purge system of the invention provides a simpler more effective way for one to conduct a final tie in to an existing special gas system. Today's projects have coordination so tight, with no regard for temperatures exceeding 1500 degrees Fahrenheit. There is often a lack of room when brazing joints with wires, duct work, sprinkler systems, communication systems, and pneumatic systems, walls, ceilings, and many other obstacles preventing a clear shot at heating up a joint of any size. During this process an immense amount of concentration is necessary to remain alert, in order to not damage a surrounding item while proficiently brazing a joint in a special gas system. That is why the Blaton band purge system of the present invention becomes so practical and is so crucial in today's special gas applications. The inert gas purge is dispensed out from the gas source to the orifice part of the purge fitting. This removes the uncertainty of how to properly purge a special gas system adequately. Many hours of lost labor have been previously spent on how to properly purge a special gas system adequately. The Blaton purge system of the invention is a sure and positive way to implement a properly installed purged special gas system. Until now there has never been a concise and precise procedure to correctly purge a special gas system leaving minimal room for error.

Special orders can be made for a modified system, as the Blaton purge system should be able to accommodate any possible system that may be constructed. This too will ensure the best and safest way to a final tie-in connection to special gas system. If at all possible, the user should always reduce the larger diameter tubing to the smaller sized tubing before applying the purge tie in fitting. This will ensure a more even flow from one end to the outlet source of the system when purging the system.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

What is claimed is:

1. A tube purge coupling fitting, for coupling tubular copper gas transporting sections of a gas delivery line together by brazing, comprising:
    a tubular member having no threads associated therewith and having an inlet section for containing a first copper tube section slip fitted therein without threads and having an outlet section for containing a second copper tube section slip fitted therein without threads;
    said tubular member having a central section, positioned between said inlet section and said outlet section
    said tubular member having an internal diameter of substantially the same diameter throughout;
    a raised portion on said central section of said tubular member;
    at least one gas purging orifice located in said raised portion and passing through said tubular member for directing purging gases from within said tube purge coupling fitting directly into the atmosphere; and
    a concave portion surrounding only said gas purging orifice, said orifice being centered within said concave portion.

2. The fitting of claim 1 wherein the orifice is located at a top portion of the fitting.

3. The fitting of claim 1 wherein said raised portion comprises a band and the orifice is located on the raised band portion.

4. The fitting of claim 1 wherein relationships between purge fitting diameters, purging orifice diameters, and number of orifices are specified in the table of FIG. 3.

5. The fitting of claim 4 wherein said raised portion comprises a band and the orifice is located on the raised band portion.

6. The fitting of claim 4 wherein said raised portion comprises a band and relationships between band height and band width are specified in the table of FIG. 3.

7. The fitting of claim 1, wherein said raised portion comprises a band and relationships between band height and band width are specified in the table of FIG. 3.

* * * * *